United States Patent
Woods et al.

(10) Patent No.: US 10,760,468 B1
(45) Date of Patent: *Sep. 1, 2020

(54) WATER SEPARATOR FOR MARINE EXHAUST SYSTEM

(71) Applicants: Woodrow Woods, Riviera Beach, FL (US); Darrin Woods, Riviera Beach, FL (US)

(72) Inventors: Woodrow Woods, Riviera Beach, FL (US); Darrin Woods, Riviera Beach, FL (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/106,829

(22) Filed: Aug. 21, 2018

Related U.S. Application Data

(63) Continuation of application No. 14/872,352, filed on Oct. 1, 2015, now Pat. No. 10,054,029.

(60) Provisional application No. 62/058,265, filed on Oct. 1, 2014.

(51) Int. Cl.
*F01N 13/12* (2010.01)
*F01N 3/04* (2006.01)
*F01N 3/037* (2006.01)

(52) U.S. Cl.
CPC .......... *F01N 13/12* (2013.01); *F01N 3/037* (2013.01); *F01N 3/04* (2013.01); *F01N 2240/22* (2013.01); *F01N 2470/18* (2013.01); *F01N 2590/02* (2013.01); *Y02T 10/20* (2013.01)

(58) Field of Classification Search
CPC .. F01N 13/12; F01N 2240/22; F01N 2470/18; F01N 2590/02; F01N 3/037; F01N 3/04; Y02T 10/20
See application file for complete search history.

(56) References Cited

U.S. PATENT DOCUMENTS

| | | | | |
|---|---|---|---|---|
| 3,967,941 A | * | 7/1976 | Terao | F01N 3/021 96/318 |
| 4,019,456 A | * | 4/1977 | Harbert | B63H 21/32 440/88 R |
| 4,344,538 A | * | 8/1982 | Fujisawa | B04C 5/103 209/717 |
| 5,022,877 A | * | 6/1991 | Harbert | B63H 21/32 181/215 |
| 5,746,630 A | * | 5/1998 | Ford | B63H 21/32 181/260 |
| 8,246,403 B2 | | 8/2012 | Woods | |
| 8,992,275 B1 | | 3/2015 | Woods | |

* cited by examiner

*Primary Examiner* — Anthony Ayala Delgado
(74) *Attorney, Agent, or Firm* — Mark D. Bowen; Malin Haley DiMaggio & Bowen, P.A.

(57) ABSTRACT

A water separator for use in a marine exhaust system comprises a horizontally disposed, generally cylindrical housing including a wet exhaust inlet, a dry exhaust outlet, and a water outlet. Wet exhaust entering the wet exhaust inlet is constrained against the inner housing wall by a variable geometry vane or baffle which causes the wet exhaust to accelerate such that centrifugal force causes the entrained water to separate from the exhaust gas. Separated water encounters a longitudinally disposed barrier and flows to the water outlet for discharge from the vessel. A tubular dry exhaust pipe is longitudinally disposed within the housing and includes an inlet disposed in proximity to a first end thereof, and an outlet projecting from a second end thereof.

4 Claims, 4 Drawing Sheets

WATER SEPARATOR FOR MARINE EXHAUST SYSTEM

CROSS REFERENCE TO RELATED APPLICATIONS

This application is a continuation of U.S. patent application Ser. No. 14/872,352, filed on Oct. 1, 2015, now U.S. Pat. No. 10,054,029, which claims the benefit of provisional U.S. Patent Application Ser. No. 62/058,265, filed on Oct. 1, 2014.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to marine exhaust systems for use in connection with internal combustion marine engines, and more particularly to a water separator for separating exhaust cooling water entrained by flowing marine exhaust.

2. Description of Related Art

Marine vessels are typically configured with a propulsion system powered by an internal combustion engine mounted within the vessel hull. Exhaust generated by the engine is commonly combined with cooling water and routed through exhaust conduit to the stern of the vessel via one or more exhaust ducts where the exhaust is discharged through one or more exhaust ports formed in the transom. One or more mufflers are installed within the exhaust duct(s) to silence noise associated with the engine and exhaust gases.

A variety of marine exhaust structures are known in the background art. The present inventor has invented a number of novel marine exhaust components that have greatly improved the silencing and efficiency of marine exhaust systems. Among those inventions developed by a named inventor for the present invention are the following:

| U.S. Pat. No. | Entitled |
|---|---|
| 4,918,917 | Liquid Cooled Exhaust Flange |
| 5,196,655 | Muffler for Marine Engines |
| 5,228,876 | Marine Exhaust System Component Comprising a Heat Resistant Conduit |
| 5,262,600 | In-line Insertion Muffler for Marine Engines |
| 5,444,196 | In-line Insertion Muffler for Marine Engines |
| 5,504,280 | Muffler for Marine Engines |
| 5,616,893 | Reverse Entry Muffler With Surge Suppression Feature |
| 5,625,173 | Single Baffle Linear Muffler for Marine Engines |
| 5,718,462 | Muffler Tube Coupling With Reinforcing Inserts |
| 5,740,670 | Water Jacketed Exhaust Pipe for Marine Exhaust Systems. |
| 6,564,901 | Muffler for Marine Engine |
| 7,581,620 | Marine Muffler with Angularly Disposed Internal Baffle |
| 7,905,322 | Marine Muffler with Angularly Disposed Internal Baffle |
| 7,942,238 | Marine Muffler with Angularly Disposed Internal Baffle |
| 8,246,403 | Marine Water Drop Muffler |
| 8,651,907 | Water Jacketed Marine Exhaust Components Having Multiple Stream Spray Ring Configurations |
| 8,992,275 | Marine Water Drop Muffler |

In U.S. Pat. Nos. 8,246,403 and 8,992,275, the present inventor discloses water drop mufflers, comprising in combination a muffler device and water separator, for use in a marine exhaust system to silence exhaust noise while separating entrained water from exhaust gas using hydro-dynamic centrifugal separation principles enhanced by turbulent flow. Once separated from the flowing exhaust gas, the water is discharged from the vessel.

There remains a need in the art, however, for advancements directed to the separation of water entrained within marine exhaust. More particularly, there exists a need for a dedicated water separator which may be used in conjunction with a variety of marine mufflers to maximize water separation in various engine and exhaust muffler applications.

BRIEF SUMMARY OF THE INVENTION

The present invention overcomes limitations present in the art by providing an improved water separator for use in downstream conjunction with a marine muffler in a variety of marine exhaust applications. A water separator in accordance with the present invention comprises a generally cylindrical housing including a wet exhaust inlet, a dry exhaust outlet, and a water outlet. When installed, the cylindrical housing is disposed generally horizontally within the marine vessel. The wet exhaust inlet is preferably disposed tangentially at or near the bottom of the housing so as to inject wet marine exhaust generally tangentially relative to the interior housing wall. Wet exhaust entering the wet exhaust inlet is constrained against the inner housing wall by a variable geometry vane or baffle which causes the wet exhaust to accelerate such that centrifugal force causes the entrained water to separate from the exhaust gas. Once separated, the water encounters a longitudinally disposed barrier or dam that stops the water. Once stopped, the water is routed to the water outlet for discharge from the vessel, and the exhaust gas exits through a dry exhaust outlet for discharge from the vessel. A tubular dry exhaust pipe is longitudinally disposed relative to the housing with an inlet located within the housing in proximity to a first end thereof, and an outlet projecting from a second end of the housing.

Accordingly, it is an object of the present invention to provide advancements in the field of marine exhaust systems.

Another object of the present invention is to provide a dedicated water separator for use in separating entrained cooling water from flowing marine exhaust.

Still another object of the present invention is to provide a marine exhaust water separator wherein wet exhaust is accelerated within the separator so as to separate entrained water from the wet exhaust using centrifugal force.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
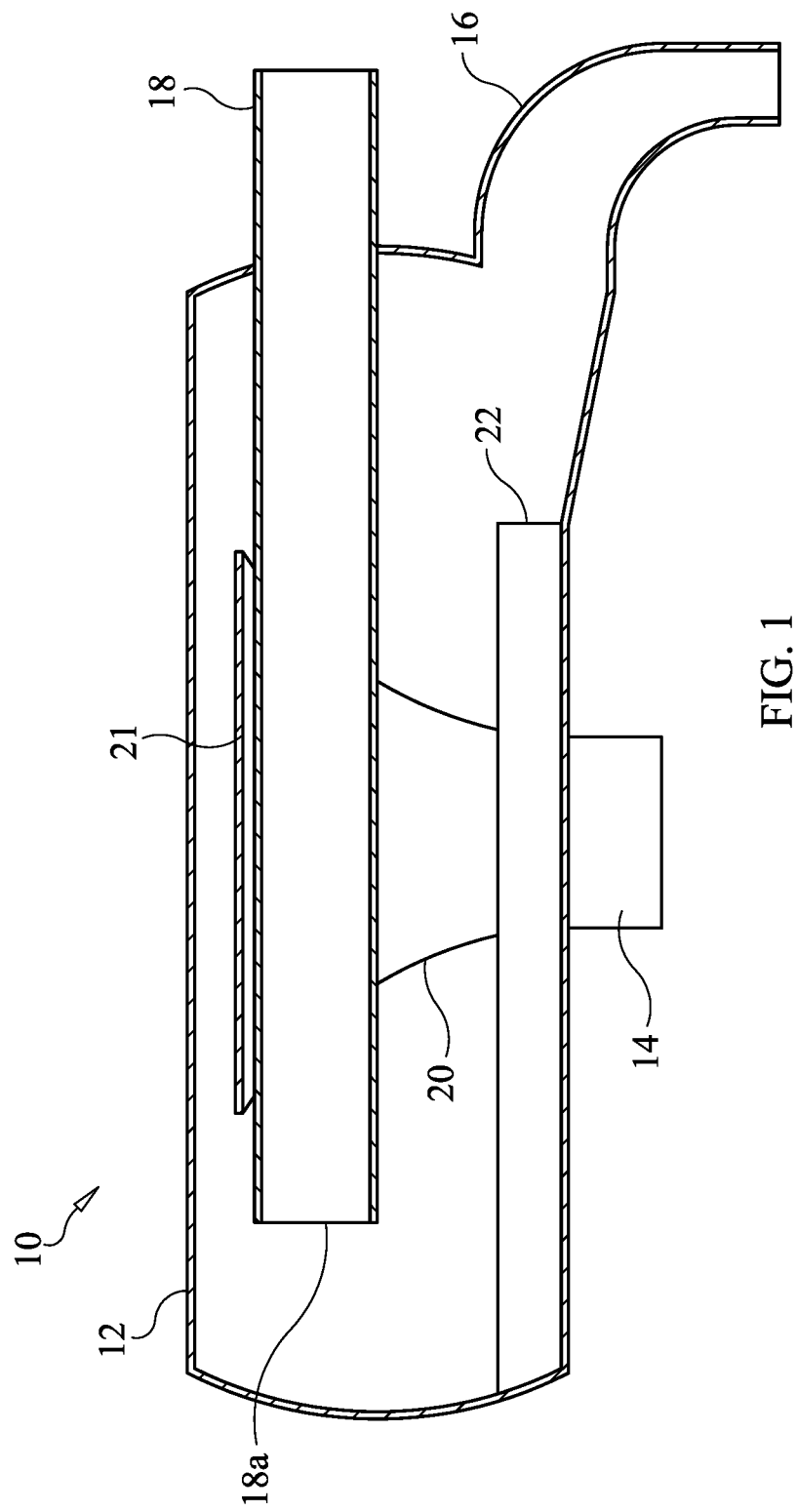
FIG. 1 is a schematic sectional elevational view of a marine exhaust water separator in accordance with the present invention.
Figure 2:
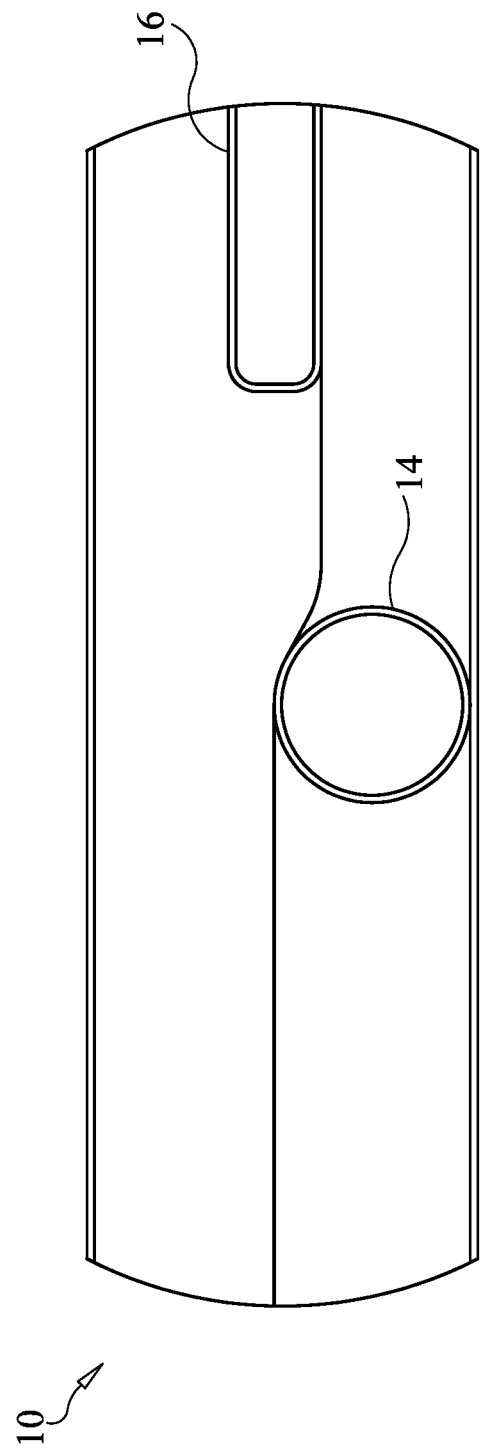
FIG. 2 is a schematic sectional end view thereof.
Figure 3:
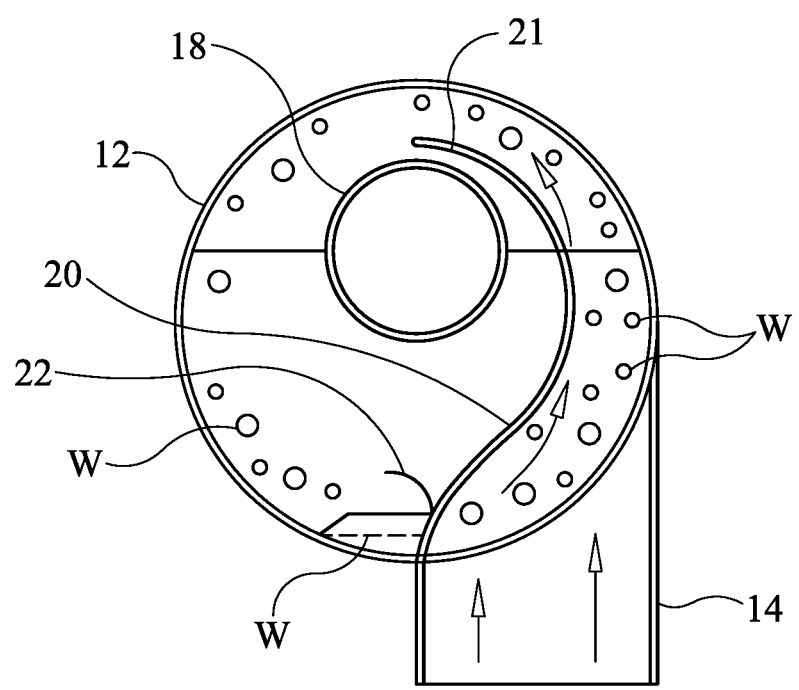
FIG. 3 is schematic bottom view of the water separator.
Figure 4:
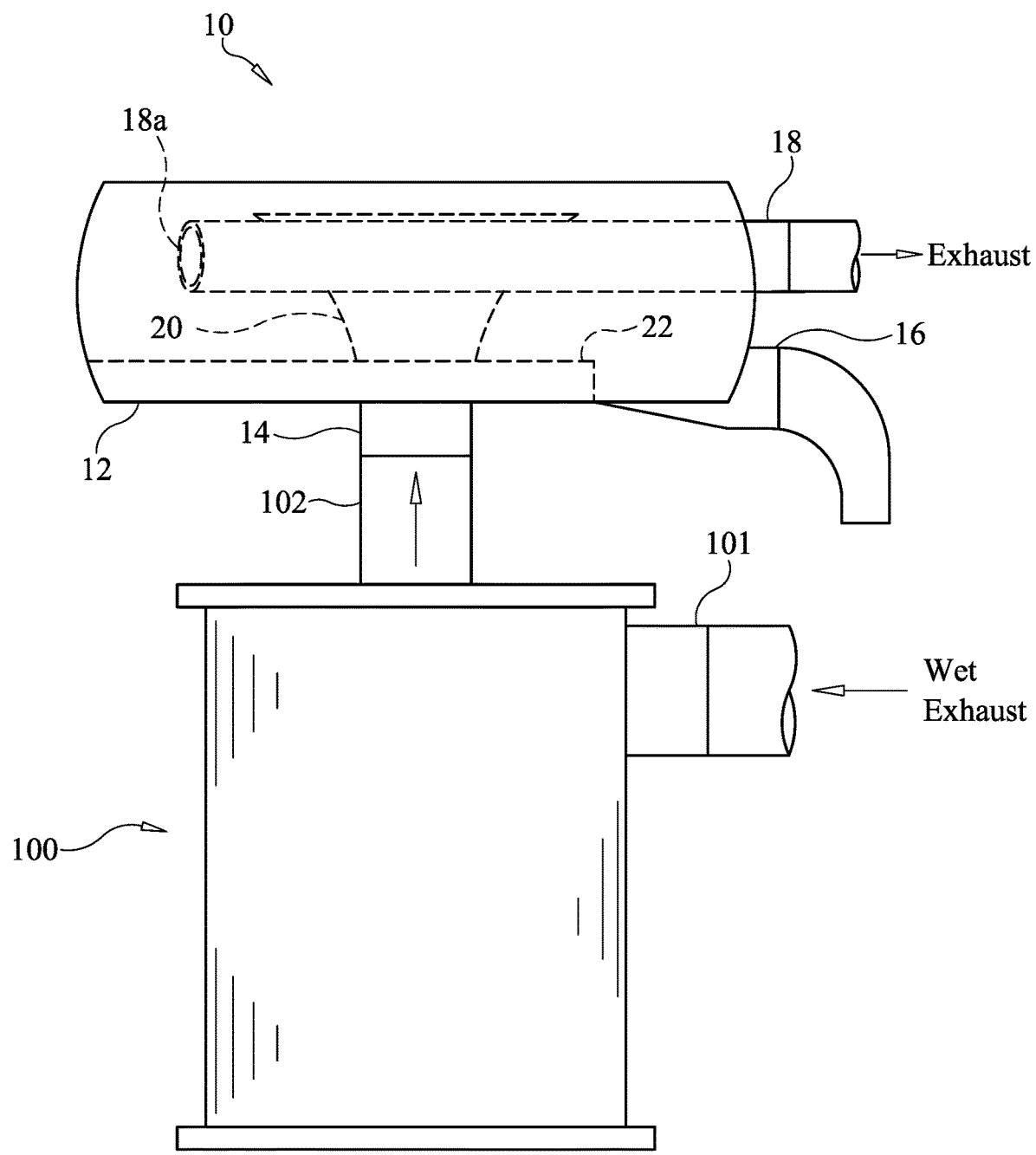
FIG. 4 illustrates the water separator installed in a marine exhaust system.

Turning now to the drawings, FIGS. 1-4 illustrate an improved water separator, generally referenced as 10, for use with marine exhaust systems. FIGS. 1-3 depict a water separator 10 in accordance with a preferred embodiment, and FIG. 4 provides a schematic illustration of water separator 10 installed in conjunction with a marine muffler 100. Water separator 10 includes a generally cylindrical housing 12 having a wet exhaust inlet 14, a water outlet 16, and an exhaust outlet 18. Housing 12 comprises a substantially hollow vessel defining an internal volume. Housing 12 is preferably fabricated from heat resistant fiberglass, however any suitable material is considered within the scope of the present invention. When operatively installed, wet exhaust inlet 14 is in fluid communication with the outlet of a marine muffler, which is in turn in fluid communication with an engine exhaust duct, such that "wet" exhaust flows into housing 12 via inlet 14. The term "wet exhaust" shall broadly be construed to mean the combination of exhaust gas and entrained cooling water and/or water vapor flowing from an internal combustion marine exhaust engine adapted with an exhaust cooling water spray can as is known in the art.

As illustrated in FIG. 4, water separator 10 is installed downstream of a marine muffler 100 with wet exhaust inlet 14 in fluid communication with the muffler outlet 102. Wet exhaust inlet 14 is preferably connected to housing 12 at or near the bottom thereof in a generally tangential or offset orientation as best illustrated in FIG. 3. We exhaust inlet 14, however, may be disposed at any location on the housing provided the wet exhaust is ultimately routed along the cylindrical inner housing surface as more fully discussed herein below. Wet exhaust entering housing 12, via wet exhaust inlet 14, is constrained along the cylindrical inner surface of housing 12 by a variable geometry vane 20. As used herein the term "variable geometry vane" shall be broadly construed to mean a duct or deflection structure in spaced relation with the cylindrical inner surface of the housing that flattens and widens the exhaust gas flow profile terminating in a manner so as to discharge the wet exhaust longitudinally dispersed along the curved interior wall of the housing. Accordingly, variable geometry vane 20 may include side walls in sealing engagement with the internal surface of said housing, or may simply comprise a curved plate or baffle without sidewalls. Vane 20 is shaped so as to accelerate the wet exhaust flow and/or maintain exhaust velocity such that centrifugal force causes the entrained water to coalesce along, or move to, the inner surface of housing 12. More particularly, variable geometry vane 20 cooperates with arcuate interior wall of housing 12 to spread longitudinally and thin the wet exhaust flow profile along the interior housing wall. Vane 20 preferably has a width which increases from wet inlet 14 until termination as best seen in FIGS. 1 and 4. In addition the spacing between vane 20 and in the inner housing surface preferably decreases from wet inlet until termination as seen in FIG. 3. The dimensions and positioning of variable geometry vane 20 are selected based on exhaust flow volume (e.g. cubic feet per minute) so as to maintain exhaust flow velocity at a suitable level whereby centrifugal-force forces entrained cooling water radially outward where it collects and flows along the interior housing wall. Vane 20 preferably terminates at a discharge end 21 located proximal the internal top portion of housing 12. This configuration allows gravity to assist in maintaining flow velocity as the exhaust and entrained water travels from the top of the housing downward. By orienting cylindrical housing 12 in a horizontal configuration and discharging wet exhaust with a flattened flow profile along substantially the entire length of the top inner surface, the present invention is believed to achieve improved water separation performance as compared with prior art separators wherein the housing is vertically oriented.

Housing 12 further includes an elongate projecting barrier or dam 22 which functions to stop and collect the flow of water flowing along the interior surface of housing 12. More particularly, barrier 22 projects generally vertically along the lower portion of the housing interior surface, and runs longitudinally along a significant portion of the length of the housing as best seen in FIGS. 1 and 3. In a preferred embodiment, barrier 22 is generally C-shaped, as depicted in FIG. 3, with the concave portion of the C-shaped facing the oncoming flow of water traveling along the interior surface of housing 12. It should be noted, however, that any suitable projecting structure is considered within the scope of the present invention. Water collected along the length of barrier 22 is routed to water outlet 16 whereby the water is allowed to flow from, or drain from, the housing as illustrated in FIG. 3 wherein the water is represented by "W". Water outlet 16 is preferably in fluid communication with a vessel thru-hull outlet whereby the water may flow or be pumped from the vessel.

Exhaust exits housing 12 via an exhaust outlet pipe 18. FIGS. 1-3 depict an embodiment wherein an exhaust outlet pipe 18 which extends into housing 12 and is longitudinally disposed above the housing floor to allow for exhaust to from the end of the housing. Outlet pipe 18 includes an open end 18a through which exhaust gas flows from the housing interior into the outlet pipe for eventual discharge from the vessel. Outlet pipe 18 preferably extends into housing 12 such that the open end is disposed beyond the termination of the wet exhaust inlet and variable geometry vane 20 as illustrated in FIG. 1. In this configuration the exhaust outlet pipe further functions as a cylindrical baffle to encourage the circumferential flow of wet exhaust flowing from the terminus of variable geometry vane 20. Outlet pipe 18 may be axially disposed relative to the cylindrical housing structure, or may be axially offset as illustrated in FIG. 3.

FIG. 4 illustrates the water separator 10 disposed relative to a marine muffler, referenced as 100. Marine muffler 100 is depicted for schematic illustration only, and is intended to represent any suitable marine muffler. As seen in FIG. 4, wet exhaust enters muffler 100 via an inlet 101, and exits the muffler via an outlet 102. The wet exhaust enters water separator 10 via wet exhaust inlet 14 wherein the exhaust flow profile is flattened and widened by variable geometry vane 20. Exhaust gas flowing from vane 20 flows along the interior wall of housing 12 where centrifugal force causes water to coalesce along the housing wall. Barrier 22 provides a barricade that removes the energy from the flowing water effectively blocking further flow. The water then exits housing 12 by flowing from water outlet 16. Meanwhile, exhaust gas having a significant amount of entrained water liberated therefrom exits housing 12 through outlet pipe 18 by entering open end 18*a*. Both the water exiting outlet 16 and the exhaust gas exiting outlet pipe 18 are handled by suitable piping, ducts, or conduits for ultimate discharge from the vessel.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A water separator for use in a marine exhaust system, said water separator comprising:
   a horizontally disposed cylindrical housing formed about a longitudinal axis, said housing defining an internal volume bounded by a cylindrical inner surface and opposing ends;
   said housing including a wet exhaust inlet disposed perpendicular to said longitudinal axis;
   a vane disposed in spaced relation with the cylindrical inner surface of said housing, said vane configured to longitudinally spread and thin the wet exhaust flow profile along the interior housing wall, said vane having a longitudinal width that increases from said wet exhaust inlet toward a terminal end thereof, and said vane configured such that spacing between said vane and said housing cylindrical inner surface decreases from said wet inlet toward said terminal end;
   a water outlet disposed at the bottom of said housing; and
   an exhaust outlet pipe longitudinally disposed within said internal volume, said exhaust pipe having an open exhaust inlet end disposed within in proximity to a first end of said housing, and said exhaust outlet pipe projecting from an opposing second end of said housing.

2. The water separator according to claim 1, further including a water barrier extending longitudinally within said internal volume and projecting from said cylindrical inner surface.

3. The water separator according to claim 2, wherein said water barrier defines a concave surface.

4. A water separator for use in a marine exhaust system, said water separator comprising:
   a horizontally disposed cylindrical housing formed about a longitudinal axis, said housing defining an internal volume bounded by a cylindrical inner surface and opposing ends;
   said housing including a wet exhaust inlet disposed perpendicular to said longitudinal axis, said wet exhaust inlet configured to inject exhaust gas and entrained cooling water along said cylindrical inner surface;
   said wet exhaust inlet in fluid communication with a variable geometry vane terminating within said internal volume in proximity to a top portion thereof, whereby said wet exhaust is dispersed along said cylindrical inner surface;
   a water outlet disposed at the bottom of said housing; and
   an exhaust outlet pipe longitudinally disposed within said internal volume, said exhaust pipe having an open exhaust inlet end disposed in proximity to a first end of said housing, and said exhaust outlet pipe projecting from an opposing second end of said housing.

* * * * *